US012658479B2

(12) United States Patent
Han et al.

(10) Patent No.: US 12,658,479 B2
(45) Date of Patent: Jun. 16, 2026

(54) NON-AQUEOUS ELECTROLYTE SOLUTION FOR LITHIUM SECONDARY BATTERY AND LITHIUM SECONDARY BATTERY INCLUDING THE SAME

(71) Applicant: LG ENERGY SOLUTION, LTD., Seoul (KR)

(72) Inventors: Jun Hyeok Han, Daejeon (KR); Chul Haeng Lee, Daejeon (KR); Kyoung Ho Ahn, Daejeon (KR); Sol Ji Park, Daejeon (KR); Won Kyung Shin, Daejeon (KR); Su Hyeon Ji, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 819 days.

(21) Appl. No.: 18/017,376

(22) PCT Filed: Jan. 11, 2022

(86) PCT No.: PCT/KR2022/000473

§ 371 (c)(1),
(2) Date: Jan. 20, 2023

(87) PCT Pub. No.: WO2022/154430

PCT Pub. Date: Jul. 21, 2022

(65) Prior Publication Data

US 2023/0299360 A1 Sep. 21, 2023

(30) Foreign Application Priority Data

Jan. 15, 2021 (KR) ........................ 10-2021-0006096
Jan. 15, 2021 (KR) ........................ 10-2021-0006097

(51) Int. Cl.

*H01M 10/0569* (2010.01)
*H01M 10/052* (2010.01)
*H01M 10/0567* (2010.01)
*H01M 10/0568* (2010.01)

(52) U.S. Cl.

CPC ..... *H01M 10/0569* (2013.01); *H01M 10/052* (2013.01); *H01M 10/0567* (2013.01); *H01M 10/0568* (2013.01); *H01M 2300/0042* (2013.01)

(58) Field of Classification Search

CPC ........... H01M 10/052; H01M 10/0567; H01M 10/0568; H01M 10/0569
USPC ........................................................ 429/331
See application file for complete search history.

(56) References Cited

U.S. PATENT DOCUMENTS

| | | | |
|---|---|---|---|
| 10,243,239 | B1 | 3/2019 | Ahn et al. |
| 2011/0318645 | A1 | 12/2011 | Han et al. |
| 2015/0340736 | A1 | 11/2015 | Kim et al. |
| 2016/0204468 | A1 | 7/2016 | Makino et al. |
| 2018/0342767 | A1 | 11/2018 | Ahn et al. |
| 2019/0006715 | A1 | 1/2019 | Sivasubramanian et al. |
| 2019/0058216 | A1 | 2/2019 | Oh et al. |
| 2020/0181308 | A1 | 6/2020 | Makino et al. |
| 2021/0036365 | A1 | 2/2021 | Kim et al. |
| 2021/0194052 | A1 | 6/2021 | Oh et al. |
| 2021/0359342 | A1 | 11/2021 | Park et al. |
| 2022/0093970 | A1 | 3/2022 | Goh et al. |

FOREIGN PATENT DOCUMENTS

| | | | |
|---|---|---|---|
| CN | 105280952 | A | 1/2016 |
| CN | 108736062 | A | 11/2018 |
| JP | 2019-157008 | A | 9/2019 |
| KR | 10-2003-0061219 | A | 7/2003 |
| KR | 10-2012-0000399 | A | 1/2012 |
| KR | 10-2013-0142387 | A | 12/2013 |
| KR | 10-2016-0040128 | A | 4/2016 |
| KR | 10-2016-0051877 | A | 5/2016 |
| KR | 10-2018-0026358 | A | 3/2018 |
| KR | 10-2018-0036733 | A | 4/2018 |
| KR | 10-2019-0044427 | A | 4/2019 |
| KR | 10-2019-0064459 | A | 6/2019 |
| KR | 10-2020-0003740 | A | 1/2020 |
| KR | 10-2020-0034635 | A | 3/2020 |
| KR | 10-2102985 | B1 | 4/2020 |
| KR | 10-2132241 | B1 | 7/2020 |
| KR | 10-2133384 | B1 | 7/2020 |
| KR | 10-2020-0097105 | A | 8/2020 |
| WO | 2020-060293 | A1 | 3/2020 |

OTHER PUBLICATIONS

Extended European Search Report issued in corresponding European patent application 22739625.6 dated Dec. 21, 2023.
International Search Report (with partial translation) and Written Opinion dated Apr. 20, 2022, for corresponding International Patent Application No. PCT/KR2022/000473.

*Primary Examiner* — Kevin P Kerns
(74) *Attorney, Agent, or Firm* — Morgan, Lewis & Bockius LLP

(57) ABSTRACT

The present invention relates to a non-aqueous electrolyte solution for a lithium secondary battery, which includes an oligomer represented by Formula 1, a lithium salt, and an organic solvent, and a lithium secondary battery including the same.

15 Claims, No Drawings

NON-AQUEOUS ELECTROLYTE SOLUTION FOR LITHIUM SECONDARY BATTERY AND LITHIUM SECONDARY BATTERY INCLUDING THE SAME

TECHNICAL FIELD

This application claims priority from Korean Patent Application Nos. 10-2021-0006096, filed on Jan. 15, 2021, and 10-2021-0006097, filed on Jan. 15, 2021, the disclosures of which are incorporated by reference herein.

The present invention relates to a non-aqueous electrolyte solution for a lithium secondary battery and a lithium secondary battery including the same.

BACKGROUND ART

Recently, demand for a secondary battery having high stability as well as high capacity and high output is increasing as an application area of lithium secondary batteries is rapidly expanding not only to electricity, electronics, communication, and power supply of electronic devices such as computers, but also to power storage supply of automobiles or large-area devices such as power storage devices.

In general, a positive electrode and a negative electrode are respectively prepared by coating a positive electrode collector and a negative electrode collector with materials, in which a positive electrode active material formed of a lithium-containing transition metal oxide or a carbon material or silicon negative electrode active material capable of intercalating and deintercalating lithium ions and optionally a binder and a conductive agent are mixed, respectively, an electrode assembly having a predetermined shape is formed by stacking these electrodes on both sides of a separator, and a lithium secondary battery is then prepared by inserting the electrode assembly and a non-aqueous electrolyte solution into a battery case. Herein, formation and aging processes are almost essentially performed in order to ensure performance of the battery.

The formation process is a step of activating the secondary battery by repeating charge and discharge after assembling the battery, wherein lithium ions from the lithium-containing transition metal oxide used as the positive electrode are transferred and intercalated into the carbon material negative electrode active material used as the negative electrode during the charge. In this case, the highly reactive lithium ions react with an electrolyte to form compounds such as $Li_2CO_3$, $Li_2O$, and LiOH, and these compounds form a solid electrolyte interface (SEI) on a surface of the electrode. Since the SEI closely affects lifetime and capacity maintenance, the formation of the SEI is an important factor.

Particularly, high capacity, high output, and long life characteristics are important for a lithium secondary battery for an automobile. As a positive electrode active material having high energy density but low stability is used in the positive electrode to achieve high capacity, research on a method of forming an active material-electrolyte interface capable of stabilizing the positive electrode active material by protecting a surface of the positive electrode active material has emerged. Also, with respect to the negative electrode, since a problem, in which surface species of the negative electrode are decomposed in the electrolyte solution to cause a side reaction, has been reported, there is a need to form a robust and low-resistance SEI.

Particularly, since the SEI is gradually collapsed during storage at a high temperature to cause a problem such as electrode exposure, there is a need to develop an additive in the electrolyte solution which helps to form an SEI that may suppress a side reaction during the high-temperature storage.

Furthermore, since the non-aqueous electrolyte solution is disadvantageous in that there is not only a high possibility that the electrode material is degraded and an organic solvent is volatilized, but safety is also poor due to combustion caused by an increase in ambient temperature and temperature of the battery itself, there is a need to develop an electrolyte for a lithium secondary battery in which performance and safety are simultaneously ensured by compensating for these disadvantages.

DISCLOSURE OF THE INVENTION

Technical Problem

An aspect of the present invention provides a non-aqueous electrolyte solution containing an oligomer and a lithium secondary battery having improved safety and high-temperature performance by including the same.

Technical Solution

According to an aspect of the present invention, there is provided a non-aqueous electrolyte solution for a lithium secondary battery which includes: an oligomer represented by Formula 1; a lithium salt; and an organic solvent.

[Formula 1]

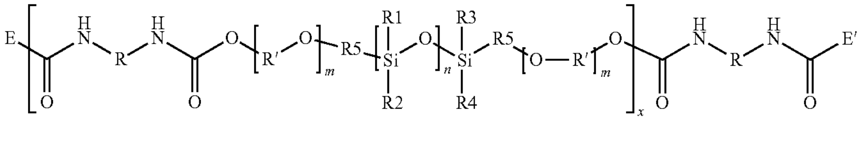

In Formula 1,

R is an aliphatic hydrocarbon group or an aromatic hydrocarbon group,

R' is an unsubstituted or substituted alkylene group having 1 to 5 carbon atoms, R1 to R4 are the same or different from each other and are each independently an unsubstituted or substituted alkyl group having 1 to 3 carbon atoms, R5 is an unsubstituted or substituted alkylene group having 1 to 5 carbon atoms, n, m, and x are repeating numbers of each unit, wherein n is an integer of 1 to 10, m is an integer of 1 to 5, and x is an integer of 1 to 200, and E and E' are the same or different from each other and are each independently represented by Formula 2,

[Formula 2]

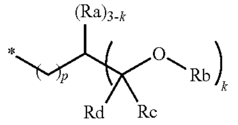

In Formula 2,

Ra and Rb are the same or different from each other and are each independently hydrogen; an alkyl group having 1 to 6 carbon atoms which is unsubstituted or substituted with a halogen group; or an alkenyl group having 1 to 6 carbon atoms which is unsubstituted or substituted with a halogen group, Rc and Rd are the same or different from each other and are each independently hydrogen or an alkyl group having 1 to 5 carbon atoms, Rb and Rc may be bonded to each other to form a cycloalkyl group including O, and p and k each are a repeating number, wherein p is an integer of 0 to 4, and k is an integer of 1 to 3.

According to another aspect of the present invention, there is provided a lithium secondary battery including: a positive electrode including a positive electrode active material; a negative electrode including a negative electrode active material; a separator disposed between the positive electrode and the negative electrode; and the non-aqueous electrolyte solution.

Advantageous Effects

According to the present invention, a non-aqueous electrolyte solution capable of forming a thinner and denser protective film on a surface of an electrode may be prepared by further including an oligomer having a specific structure in an organic solvent in which a lithium salt is dissolved. Also, a lithium secondary battery having improved safety and high-temperature lifetime may be prepared by using the non-aqueous electrolyte solution.

BEST MODE FOR CARRYING OUT THE INVENTION

Hereinafter, the present invention will be described in more detail to allow for a clearer understanding of the present invention.

The expression "*-" in the present specification denotes a site connected to a main chain in an oligomer or connected to a bonding portion, such as another monomer, a substituent, or a terminal group, in a formula.

The term 'substitution' means that a hydrogen atom bonded to a carbon atom of a compound is replaced with another substituent, wherein a position to be substituted is not limited as long as it is a position where the hydrogen atom is substituted, that is, a position where the substituent may be substituted, and, when two or more substituents are substituted, the two or more substituents may be the same or different from each other.

The expression 'substituted or unsubstituted' in the present specification means that a compound is substituted with at least one substituent selected from heavy hydrogen; oxygen; a halogen group; a nitrile group; a nitro group; a hydroxy group; an alkyl group; a cycloalkyl group; an aryl group; and a heterocyclic group, is substituted with a substituent in which two or more substituents among the above-exemplified substituents are connected, or does not have any substituent.

In the present specification, an alkylene group, an alkenylene group, an alkynylene group, and an arylene group mean those with two bonding sites in an alkyl group, an alkenyl group, an alkynyl group, and an aryl group, respectively, that is, divalent groups.

Non-aqueous Electrolyte Solution

In an embodiment of the present invention, a non-aqueous electrolyte solution for a lithium secondary battery includes an oligomer represented by the following Formula 1; a lithium salt; and an organic solvent.

[Formula 1]

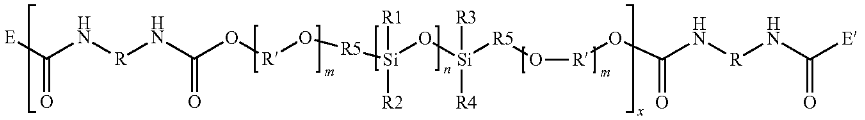

In Formula 1,

R is an aliphatic hydrocarbon group or an aromatic hydrocarbon group,

R' is an unsubstituted or substituted alkylene group having 1 to 5 carbon atoms, R1 to R4 are the same or different from each other and are each independently an unsubstituted or substituted alkyl group having 1 to 3 carbon atoms, R5 is an unsubstituted or substituted alkylene group having 1 to 5 carbon atoms, n, m, and x are repeating numbers of each unit, wherein n is an integer of 1 to 10, m is an integer of 1 to 5, and x is an integer of 1 to 200, and E and E' are the same or different from each other and are each independently represented by the following Formula 2,

[Formula 2]

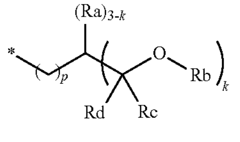

In Formula 2,

Ra and Rb are the same or different from each other and are each independently hydrogen; an alkyl group having 1 to 6 carbon atoms which is unsubstituted or substituted with a halogen group; or an alkenyl group having 1 to 6 carbon atoms which is unsubstituted or substituted with a halogen group, Rc and Rd are the same or different from each other and are each independently hydrogen or an alkyl group having 1 to 5 carbon atoms, Rb and Rc may be bonded to each other to form a cycloalkyl group including O, and p and k each are a repeating number, wherein p is an integer of 0 to 4, and k is an integer of 1 to 3.

(a) Oligomer Represented by Formula 1

In an embodiment of the present invention, since the oligomer represented by Formula 1 has ability to dissociate a lithium salt, it may improve lithium ion mobility, and, particularly, since it contains a siloxane group (—Si—O—), which is electrochemically very stable and has low reactivity with lithium (Li) ions, as a repeating unit of a main chain, a side reaction of lithium ions ($Li^+$) and a decomposition reaction of the lithium salt may be controlled, and thus, generation of a gas, such as CO or $CO_2$, during overcharge may be reduced. Therefore, the oligomer may improve safety of the secondary battery by suppressing ignition at a high temperature.

Particularly, since a terminal group includes a structure of Formula 2, it may reduce reactivity with a negative electrode in comparison to a highly reactive terminal group such as an acrylate-based terminal group, and, accordingly, there is an effect of reducing resistance of the battery.

In an embodiment of the present invention, a weight-average molecular weight (Mw) of the oligomer represented by Formula 1 may be controlled by the number of repeating units, and may be in a range of about 1,000 g/mol to about 100,000 g/mol, particularly 1,000 g/mol to 50,000 g/mol, and more particularly 1,000 g/mol to 10,000 g/mol. In a case in which the weight-average molecular weight of the oligomer is greater 100,000 g/mol, since solubility in the non-aqueous electrolyte solution is low, there is a problem in that ionic conductivity is reduced.

The weight-average molecular weight was measured by a gel permeation chromatography (GPC) method. Specifically, WATERS STYRAGEL HR3/HR4 (THF) was used as a column, and tetrahydrofuran (THF) (used after filtering to 0.45 μm) was used as a solvent, and the weight-average molecular weight was measured at a flow rate of 1.0 mL/min and a sample concentration of 1 mg/mL. 100 μℓ of the sample was injected, and a column temperature was set at 40° C. A Waters RI detector was used as a detector, and a standard was set with PS (polystyrene). Data processing was performed through an Empower3 program.

In an embodiment of the present invention, Ra to Rd of Formula 2 each may be hydrogen; or an alkyl group having 1 to 6 carbon atoms.

In an embodiment of the present invention, Rb and Rc of Formula 2 are each an alkyl group having 1 to 3 carbon atoms, and may be bonded to each other to form a cycloalkyl group containing O, for example, a tetrahydrofuranyl group.

In an embodiment of the present invention, Formula 2 may be represented by Formula 2-1 or Formula 2-2 below.

$*-(CH_2)_{p'}(CH_2)_2-OH$ [Formula 2-1]

In Formula 2-1, p' is a repeating number, wherein p' is an integer of 0 to 4,

[Formula 2-2]

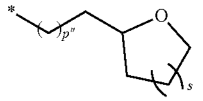

In Formula 2-2, p" and s are repeating numbers, wherein p" is an integer of 0 to 4, and s is 1 or 2.

In an embodiment of the present invention, p' may be an integer of 0 to 2, p" may be 0 or 1, and s may be 1.

In an embodiment of the present invention, E and E' of Formula 1 each may be $*-(CH_2)_3-OH$ or

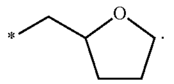 [SMILES: *CC1CCCO1]

In an embodiment of the present invention, the aliphatic hydrocarbon group of R in Formula 1 may be selected from an unsubstituted or substituted alkylene group having 1 to 20 carbon atoms; an unsubstituted or substituted cycloalkylene group having 4 to 20 carbon atoms; an unsubstituted or substituted heterocycloalkylene group having 2 to 20 carbon atoms; an unsubstituted or substituted alkenylene group having 2 to 20 carbon atoms; and an unsubstituted or substituted alkynylene group having 2 to 20 carbon atoms, and the aromatic hydrocarbon group of R may be selected from an unsubstituted or substituted arylene group having 6 to 20 carbon atoms; and an unsubstituted or substituted heteroarylene group having 2 to 20 carbon atoms.

Preferably, R in Formula 1 may be an aliphatic hydrocarbon group and, specifically, may be a cycloalkylene group having 4 to 20 carbon atoms which is unsubstituted or substituted with an alkyl group having 1 to 3 carbon atoms.

In an embodiment of the present invention, R' of Formula 1 may be an alkylene group having 1 to 5 carbon atoms, preferably an alkylene group having 2 to 4 carbon atoms, and more preferably propylene.

In an embodiment of the present invention, Formula 1 may be represented by Formula 1-1 below.

[Formula 1-1]

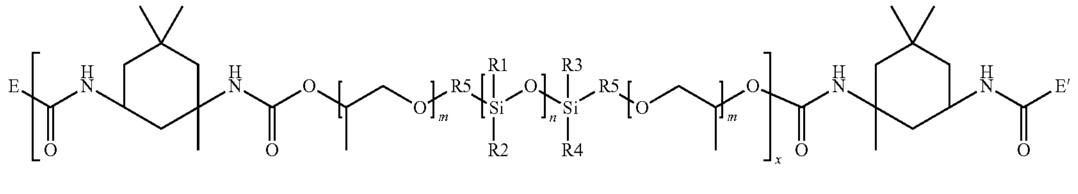

In Formula 1-1,

R, R1 to R5, E, E', n, m, and x are the same as defined in Formula 1.

Specifically, Formula 1 may be represented by Formula 1A below.

[Formula 1A]

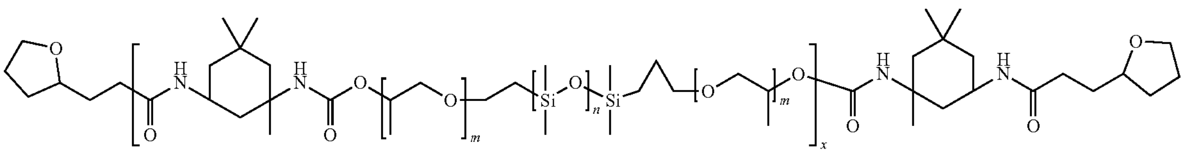

In Formula 1A, n, m, and x are the same as defined in Formula 1.

In an embodiment of the present invention, an amount of the oligomer may be in a range of 0.1 wt % to 5 wt %, preferably 0.2 wt % to 3 wt %, and more preferably 0.5 wt % to 1 wt % based on a total weight of the non-aqueous electrolyte solution.

In a case in which the amount of the oligomer is within the above range, it is desirable in terms of improving battery capacity and ensuring high-temperature safety. Specifically, in a case in which the amount of the oligomer is less than 0.1 wt %, an effect due to the addition of the oligomer is insignificant, and, in a case in which the amount of the oligomer is greater than 5 wt %, there is a problem in that initial capacity is reduced due to an increase in resistance.

(b) Additive

In an embodiment of the present invention, the non-aqueous electrolyte solution may further include at least one additive selected from the group consisting of a lithium salt-based additive and a nitrile-based additive, and may preferably include a lithium salt-based additive or a nitrile-based additive.

The lithium salt-based additive may be at least one selected from the group consisting of lithium tetrafluoroborate ($LiBF_4$), lithium bis(oxalato)borate (LiBOB), lithium difluoro(oxalato)borate (LiODFB), lithium difluorophosphate (LiDFP), and lithium difluoro bis(oxalato)phosphate (LiDFOP), and the lithium salt is different from the lithium salt-based additive. The oligomer represented by Formula 1 may contribute to the improvement of safety and high-temperature lifetime of the lithium secondary battery, but has a limitation in that the capacity of the battery is reduced due to an increase in interfacial resistance between an electrode and an electrolyte. However, in a case in which the lithium salt-based additive is used together, a thinner and denser film may be formed through an electrochemical reaction, and, accordingly, the capacity of the battery may be improved and the high-temperature lifetime may be further improved.

In an embodiment of the present invention, an amount of the lithium salt-based additive may be in a range of 0.05 wt % to 5 wt %, preferably 0.1 wt % to 3 wt %, and more preferably 0.5 wt % to 2 wt % based on the total weight of the non-aqueous electrolyte solution.

In a case in which the amount of the lithium salt-based additive is within the above range, it is desirable in terms of being able to properly compensate for a problem caused by an increase in resistance during formation of a film by the oligomer.

In an embodiment of the present invention, the non-aqueous electrolyte solution may include two or more different kinds of the lithium salt-based additives, and may preferably include LiODFB and LiBOB.

In an embodiment of the present invention, a weight ratio of the LiODFB to the LiBOB may be in a range of 10:90 to 90:10, preferably 20:80 to 80:20, and more preferably 40:60 to 60:40.

The nitrile-based additive may be at least one selected from the group consisting of succinonitrile (SN), adiponitrile (ADN), sebaconitrile (SBN), dicyanobutene (DCB), hexanetricarbonitrile (HTCN), 1,2,3-tris(2-cyanoethoxy) propane (TCEP), and ethylene glycol bis(propionitrile)ether (ASA3).

In a case in which the oligomer represented by Formula 1 and the nitrile-based additive are used together, since the nitrile-based additive controls dissolution of transition metal from a positive electrode, a synergistic effect of further improving high-temperature life performance may be obtained in comparison to the use of the oligomer alone.

In an embodiment of the present invention, an amount of the nitrile-based additive may be in a range of 0.05 wt % to 10 wt %, preferably 1 wt % to 7 wt %, and more preferably 2.5 wt % to 5 wt % based on the total weight of the non-aqueous electrolyte solution.

In a case in which the amount of the nitrile-based additive is less than 0.05 wt %, an effect of controlling the dissolution of the transition metal is insignificant, and, in a case in which the amount of the nitrile-based additive is greater than 10 wt %, there is a problem in that wetting is reduced due to an increase in viscosity and the ionic conductivity is reduced.

In an embodiment of the present invention, the non-aqueous electrolyte solution may include two or more different kinds of the nitrile-based additives, and may preferably include dicyanobutene and hexanetricarbonitrile.

In an embodiment of the present invention, a weight ratio of the dicyanobutene to the hexanetricarbonitrile may be in a range of 10:90 to 90:10, preferably 20:80 to 60:40, and more preferably 30:70 to 50:50.

In addition, the non-aqueous electrolyte solution of the present invention may optionally include the following other additives, if necessary, in order to prevent decomposition of the electrolyte or to further improve low-temperature high rate discharge characteristics, high-temperature stability, overcharge prevention, and an effect of suppressing battery swelling at high temperature.

The other additives may be at least one selected from a carbonate-based compound, a halogen-substituted carbonate-based compound, a sultone-based compound, a sulfate-based compound, a phosphate-based compound, a borate-based compound, an amine-based compound, a silane-based compound, an imide-based compound, and a benzene-based compound.

The carbonate-based compound may be at least one selected from vinylene carbonate (VC) and vinylethylene carbonate (VEC), and may specifically be vinylene carbonate.

The halogen-substituted carbonate-based compound may be fluoroethylene carbonate (FEC).

The sultone-based compound is a material capable of forming a stable solid electrolyte interface (SEI) by a reduction reaction on a surface of the negative electrode, wherein the sultone-based compound may be at least one compound selected from 1,3-propane sultone (PS), 1,4- butane sultone, ethane sultone, 1,3-propene sultone (PRS), 1,4-butene sultone, and 1-methyl-1,3-propene sultone, and may specifically be 1,3-propane sultone (PS).

The sulfate-based compound is a material which may be electrically decomposed on the surface of the negative electrode to form a stable SEI that does not crack even during high-temperature storage, wherein the sulfate-based compound may be at least one selected from ethylene sulfate (Esa), trimethylene sulfate (TMS), or methyl trimethylene sulfate (MTMS).

The phosphate-based compound may be at least one selected from lithium difluoro(bisoxalato)phosphate, lithium difluorophosphate, tris(trimethylsilyl)phosphate, tris(trimethylsilyl)phosphite, tris(2,2,2-trifluoroethyl)phosphate, and tris(trifluoroethyl)phosphite.

The borate-based compound may be lithium tetraphenylborate.

The amine-based compound may be at least one selected from triethanolamine and ethylenediamine, and the silane-based compound may be tetravinylsilane.

The imide-based compound may be N,N'-dicyclohexylcarbodiimide (DCC).

The benzene-based compound may be at least one selected from monofluorobenzene, difluorobenzene, trifluorobenzene, and tetrafluorobenzene.

An amount of the other additives may be in a range of 0.1 wt % to 15 wt %, for example, 5 wt % to 15 wt % based on the total weight of the non-aqueous electrolyte solution. In a case in which the amount of the other additives is less than 0.1 wt %, an effect of improving low-temperature capacity, high-temperature storage characteristics, and high-temperature life characteristics of the battery is insignificant, and, in a case in which the amount of the other additives is greater than 15 wt %, a side reaction in the electrolyte solution may excessively occur during charge and discharge of the battery.

(c) Lithium Salt

Any lithium salt typically used in an electrolyte for a lithium secondary battery except for the lithium salt-based additive may be used as the lithium salt, and, specifically, the lithium salt may be at least one selected from lithium hexafluorophosphate ($LiPF_6$), lithium bis(fluorosulfonyl)imide (LiFSI), and lithium bis(trifluoromethanesulfonyl)imide (LiTFSI), and may preferably be $LiPF_6$.

The lithium salt may be appropriately changed in a normally usable range, but may specifically be included in a concentration of 0.1 M to 4.0 M, for example, 1.0 M to 2.5 M in the electrolyte solution. If, in a case in which the concentration of the lithium salt is greater than 4.0 M, a lithium ion movement effect in the non-aqueous electrolyte solution may be reduced due to an increase in viscosity of the electrolyte solution.

(d) Organic Solvent

In the non-aqueous electrolyte solution according to an embodiment of the present invention, a type of the organic solvent is not limited as long as the organic solvent may minimize decomposition due to an oxidation reaction during charge and discharge of the secondary battery and may exhibit desired characteristics with the additive. For example, as the organic solvent, a carbonate-based organic solvent, an ether-based organic solvent, or an ester-based organic solvent may be used alone or in mixture of two or more thereof.

The carbonate-based organic solvent among the organic solvents may include at least one selected from a cyclic carbonate-based organic solvent and a linear carbonate-based organic solvent. Specifically, the cyclic carbonate-based organic solvent may be at least one selected from ethylene carbonate (EC), propylene carbonate (PC), 1,2-butylene carbonate, 2,3-butylene carbonate, 1,2-pentylene carbonate, 2,3-pentylene carbonate, vinylene carbonate, and fluoroethylene carbonate (FEC), and may specifically be a mixed solvent of ethylene carbonate having high permittivity and propylene carbonate having a relatively lower melting point than the ethylene carbonate.

Also, the linear carbonate-based organic solvent is an organic solvent having low viscosity and low permittivity, wherein the linear carbonate-based organic solvent may be at least one selected from dimethyl carbonate (DMC), diethyl carbonate (DEC), dipropyl carbonate, ethyl methyl carbonate (EMC), methylpropyl carbonate, and ethylpropyl carbonate, and may specifically be dimethyl carbonate.

The ether-based organic solvent may be at least one selected from dimethyl ether, diethyl ether, dipropyl ether, methyl ethyl ether, methyl propyl ether, and ethyl propyl ether, but is not limited thereto.

The ester-based organic solvent may be at least one selected from a linear ester-based organic solvent and a cyclic ester-based organic solvent.

The linear ester-based organic solvent may be at least one selected from methyl acetate, ethyl acetate, propyl acetate, methyl propionate, ethyl propionate, propyl propionate, and butyl propionate, but is not limited thereto.

The cyclic ester-based organic solvent may be at least one selected from γ-butyrolactone, γ-valerolactone, γ-caprolactone, σ-valerolactone, and ε-caprolactone, but is not limited thereto.

A highly viscous cyclic carbonate-based organic solvent, which well dissociates the lithium salt in the electrolyte due to high permittivity, may be used as the organic solvent. Also, in order to prepare an electrolyte having higher electrical conductivity, a low viscosity and low permittivity linear carbonate-based compound, such as dimethyl carbonate and diethyl carbonate, and a linear ester-based compound as well as the cyclic carbonate-based organic solvent may be mixed in an appropriate ratio and used as the organic solvent.

Specifically, the cyclic carbonate-based compound and the linear ester-based compound may be mixed and used as the organic solvent, and a weight ratio of the cyclic carbonate-based compound:the linear ester-based compound in the organic solvent may be in a range of 10:90 to 70:30.

A remainder excluding other components except for the organic solvent, for example, the oligomer, the lithium salt, and the additive, in the total weight of the non-aqueous electrolyte solution of the present invention may all be the organic solvent unless otherwise stated.

Lithium Secondary Battery

Next, a lithium secondary battery according to the present invention will be described.

The lithium secondary battery according to the present invention includes a positive electrode including a positive electrode active material, a negative electrode including a negative electrode active material, a separator disposed between the positive electrode and the negative electrode, and the above-described non-aqueous electrolyte solution. Since the non-aqueous electrolyte solution has been described above, a description thereof will be omitted and other components will be described below.

The lithium secondary battery of the present invention may be prepared according to a typical method known in the art. For example, after forming an electrode assembly in which a positive electrode, a negative electrode, and a separator disposed between the positive electrode and the negative electrode are sequentially stacked, the lithium secondary battery of the present invention may be prepared by inserting the electrode assembly into a battery case, and then injecting the non-aqueous electrolyte solution according to the present invention.

(a) Positive Electrode

The positive electrode may be prepared by coating a positive electrode collector with a positive electrode material mixture slurry including a positive electrode active material, a binder, a conductive agent, and a solvent.

The positive electrode collector is not particularly limited so long as it has conductivity without causing adverse chemical changes in the battery, and, for example, stainless steel, aluminum, nickel, titanium, fired carbon, or aluminum or stainless steel that is surface-treated with one of carbon, nickel, titanium, silver, or the like may be used.

The positive electrode active material is a compound capable of reversibly intercalating and deintercalating lithium, wherein the positive electrode active material may be at least one selected from $LiNi_{1-x-y-z}Co_xM^1_yM^2_zO_2$ ($M^1$ and $M^2$ are each independently any one selected from the group consisting of aluminum (Al), nickel (Ni), cobalt (Co), iron (Fe), manganese (Mn), vanadium (V), chromium (Cr), titanium (Ti), tungsten (W), tantalum (Ta), magnesium (Mg), and molybdenum (Mo), and x, y, and z are each independently atomic fractions of oxide composition elements, wherein $0 \le x < 0.5$, $0 \le y < 0.5$, $0 \le z < 0.5$, and $x+y+z=1$) including LCO ($LiCoO_2$), LNO ($LiNiO_2$), LMO ($LiMnO_2$), $LiMn_2O_4$, $LiCoPO_4$, LFP ($LiFePO_4$), $LiNiMnCoO_2$, and NMC ($LiNiCoMnO_2$).

Specifically, the positive electrode active material may include a lithium metal oxide including lithium and at least one metal such as cobalt, manganese, nickel, or aluminum.

More specifically, the lithium metal oxide may be at least one selected from lithium-manganese-based oxide such as $LiMnO_2$ and $LiMn_2O_4$; lithium-cobalt-based oxide such as $LiCoO_2$; lithium-nickel-based oxide such as $LiNiO_2$; lithium-nickel-manganese-based oxide such as $LiNi_{1-Y}Mn_YO_2$ (where $0<Y<1$) and $LiMn_{2-z}Ni_zO_4$ (where $0<z<2$)); lithium-nickel-cobalt-based oxide such as $LiNi_{1-Y1}Co_{Y1}O_2$ (where $0<Y1<1$)); lithium-manganese-cobalt-based oxide such as $LiCo_{1-Y2}Mn_{Y2}O_2$ (where $0<Y2<1$) and $LiMn_{2-z1}Co_{z1}O_4$ (where $0<z1<2$)); lithium-nickel-manganese-cobalt-based oxide such as $Li(Ni_pCo_qMn_{r1})O_2$ (where $0<p<1$, $0<q<1$, $0<r1<1$, and $p+q+r1=1$) and $Li(Ni_{p1}Co_{q1}Mn_{r2})O_4$ (where $0<p1<2$, $0<q1<2$, $0<r2<2$, and $p1+q1+r2=2$); and lithium-nickel-cobalt-transition metal (M) oxide such as $Li(Ni_{p2}Co_{q2}Mn_{r3}M_{s2})O_2$ (where M is selected from the group consisting of Al, Fe, V, Cr, Ti, Ta, Mg, and Mo, and p2, q2, r3, and s2 are atomic fractions of each independent elements, wherein $0<p2<1$, $0<q2<1$, $0<r3<1$, $0<s2<1$, and $p2+q2+r3+s2=1$).

Among these materials, in terms of the improvement of capacity characteristics and stability of the battery, the lithium metal oxide may be $LiCoO_2$, $LiMnO_2$, $LiNiO_2$, lithium nickel manganese cobalt oxide (e.g., $Li(Ni_{1/3}Mn_{1/3}Co_{1/3})O_2$, $Li(Ni_{0.6}Mn_{0.2}Co_{0.2})O_2$, $Li(Ni_{0.5}Mn_{0.3}Co_{0.2})O_2$, $Li(Ni_{0.7}Mn_{0.15}Co_{0.15})O_2$, $Li(Ni_{0.8}Mn_{0.1}Co_{0.1})O_2$), etc.); or lithium nickel cobalt aluminum oxide (e.g., Li $(Ni_{0.8}Co_{0.15}Al_{0.05})O_2$, etc.), and, in consideration of a significant improvement due to the control of type and content ratio of elements constituting the lithium metal oxide, the lithium metal oxide may be at least one selected from $Li(Ni_{0.6}Mn_{0.2}Co_{0.2})O_2$, $Li(Ni_{0.5}Mn_{0.3}Co_{0.2})O_2$, $Li(Ni_{0.7}Mn_{0.15}Co_{0.15})O_2$, and $Li(Ni_{0.8}Mn_{0.1}Co_{0.1})O_2$.

The positive electrode active material may be included in an amount of 60 wt % to 99 wt %, preferably 70 wt % to 99 wt %, and more preferably 80 wt % to 98 wt % based on a total weight of a solid excluding the solvent in the positive electrode material mixture slurry.

The binder is a component that assists in the binding between the active material and the conductive agent and in the binding with the current collector.

Examples of the binder may be polyvinylidene fluoride, polyvinyl alcohol, carboxymethylcellulose (CMC), starch, hydroxypropylcellulose, regenerated cellulose, polyvinylpyrrolidone, polytetrafluoroethylene, polyethylene (PE), polypropylene, an ethylene-propylene-diene monomer, a sulfonated ethylene-propylene-diene monomer, a styrene-butadiene rubber (SBR), a fluoro rubber, and various copolymers thereof.

The binder may be commonly included in an amount of 1 wt % to 20 wt %, preferably 1 wt % to 15 wt %, and more preferably 1 wt % to 10 wt % based on the total weight of the solid excluding the solvent in the positive electrode material mixture slurry.

The conductive agent is a component for further improving conductivity of the positive electrode active material.

The conductive agent is not particularly limited as long as it has conductivity without causing adverse chemical changes in the battery, and, for example, a conductive material, such as: graphite; carbon black such as acetylene black, Ketjen black, channel black, furnace black, lamp black, and thermal black; conductive fibers such as carbon fibers or metal fibers; metal powder such as fluorocarbon powder, aluminum powder, and nickel powder; conductive whiskers such as zinc oxide whiskers and potassium titanate whiskers; conductive metal oxide such as titanium oxide; and polyphenylene derivatives, may be used.

The conductive agent may be commonly included in an amount of 1 wt % to 20 wt %, preferably 1 wt % to 15 wt %, and more preferably 1 wt % to 10 wt % based on the total weight of the solid excluding the solvent in the positive electrode material mixture slurry.

The solvent may include an organic solvent, such as N-methyl-2-pyrrolidone (NMP), and may be used in an amount such that desirable viscosity is obtained when the positive electrode active material as well as optionally the binder and the conductive agent are included. For example, the solvent may be included in an amount such that a concentration of a solid content including the positive electrode active material as well as optionally the binder and the conductive agent is in a range of 50 wt % to 95 wt %, preferably 50 wt % to 80 wt %, and more preferably 55 wt % to 70 wt %.

(b) Negative Electrode

The negative electrode may be prepared by coating a negative electrode collector with a negative electrode slurry including a negative electrode active material, a binder, a conductive agent, and a solvent, and then drying and rolling the coated negative electrode collector.

The negative electrode collector generally has a thickness of 3 μm to 500 μm. The negative electrode collector is not particularly limited so long as it has high conductivity without causing adverse chemical changes in the battery, and, for example, copper; stainless steel; aluminum; nickel; titanium; fired carbon; copper or stainless steel that is surface-treated with one of carbon, nickel, titanium, silver, or the like; or an aluminum-cadmium alloy may be used. Also, similar to the positive electrode collector, the negative electrode collector may have fine surface roughness to improve bonding strength with the negative electrode active material, and the negative electrode collector may be used in various shapes such as a film, a sheet, a foil, a net, a porous body, a foam body, a non-woven fabric body, and the like.

Furthermore, the negative electrode active material may include at least one selected from the group consisting of lithium metal, a carbon material capable of reversibly intercalating/deintercalating lithium ions, metal or an alloy of lithium and the metal, a metal composite oxide, a material which may be doped and undoped with lithium, and a transition metal oxide.

As the carbon material capable of reversibly intercalating/deintercalating lithium ions, a carbon-based negative electrode active material generally used in a lithium ion secondary battery may be used without particular limitation, and, as a typical example, crystalline carbon, amorphous carbon, or both thereof may be used. Examples of the crystalline carbon may be graphite such as irregular, planar, flaky, spherical, or fibrous natural graphite or artificial graphite, and examples of the amorphous carbon may be soft carbon (low-temperature sintered carbon) or hard carbon, mesophase pitch carbide, and fired cokes.

As the metal or the alloy of lithium and the metal, a metal selected from the group consisting of copper (Cu), nickel (Ni), sodium (Na), potassium (K), rubidium (Rb), cesium (Cs), francium (Fr), beryllium (Be), magnesium (Mg), calcium (Ca), strontium (Sr), silicon (Si), antimony (Sb), lead (Pb), indium (In), zinc (Zn), barium (Ba), radium (Ra), germanium (Ge), aluminum (Al), and tin (Sn), or an alloy of lithium and the metal may be used.

At least one selected from the group consisting of PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, $Bi_2O_5$, $Li_xFe_2O_3$ ($0 \le x \le 1$), $Li_xWO_2$ ($0 \le x \le 1$), and $Sn_xMe_{1-x}Me'_yO_z$ (Me: Mn, Fe, Pb, or Ge; Me': Al, boron (B), phosphorus (P), Si, Groups I, II and III elements of the periodic table, or halogen; $0<x\le 1$; $1\le y\le 3$; $1\le z\le 8$) may be used as the metal composite oxide.

The material, which may be doped and undoped with lithium, may include Si, $SiO_x$ ($0<x\le 2$), a Si—Y alloy (where Y is an element selected from the group consisting of alkali metal, alkaline earth metal, a Group 13 element, a Group 14 element, transition metal, a rare earth element, and a combination thereof, and is not Si), Sn, $SnO_2$, and Sn—Y (where Y is an element selected from the group consisting of alkali metal, alkaline earth metal, a Group 13 element, a Group 14 element, transition metal, a rare earth element, and a combination thereof, and is not Sn), and a mixture of $SiO_2$ and at least one thereof may also be used. The element Y may be selected from the group consisting of Mg, Ca, Sr, Ba, Ra, scandium (Sc), yttrium (Y), Ti, zirconium (Zr), hafnium (Hf), rutherfordium (Rf), V, niobium (Nb), Ta, dubnium (Db), Cr, Mo, W, seaborgium (Sg), technetium (Tc), rhenium (Re), bohrium (Bh), Fe, Pb, ruthenium (Ru), osmium (Os), hassium (Hs), rhodium (Rh), iridium (Ir), palladium (Pd), platinum (Pt), Cu, silver (Ag), gold (Au), Zn, cadmium (Cd), B, Al, gallium (Ga), Sn, In, Ge, P, arsenic (As), Sb, bismuth (Bi), sulfur (S), selenium (Se), tellurium (Te), polonium (Po), and a combination thereof.

The transition metal oxide may include lithium-containing titanium composite oxide (LTO), vanadium oxide, and lithium vanadium oxide.

In the present invention, the negative electrode active material may be graphite.

The negative electrode active material may be included in an amount of 60 wt % to 99 wt %, preferably 70 wt % to 99 wt %, and more preferably 80 wt % to 98 wt % based on a total weight of a solid excluding the solvent in the negative electrode material mixture slurry.

The binder is a component that assists in the binding between the conductive agent, the active material, and the current collector. Examples of the binder may be polyvinylidene fluoride (PVDF), polyvinyl alcohol, carboxymethylcellulose (CMC), starch, hydroxypropylcellulose, regenerated cellulose, polyvinylpyrrolidone, polytetrafluoroethylene, polyethylene, polypropylene, an ethylene-propylene-diene monomer, a sulfonated ethylene-propylene-diene monomer, a styrene-butadiene rubber (SBR), a fluoro rubber, and various copolymers thereof.

The binder may be commonly included in an amount of 1 wt % to 20 wt %, preferably 1 wt % to 15 wt %, and more preferably 1 wt % to 10 wt % based on the total weight of the solid excluding the solvent in the negative electrode material mixture slurry.

The conductive agent is a component for further improving conductivity of the negative electrode active material. The conductive agent is not particularly limited as long as it has conductivity without causing adverse chemical changes in the battery, and, for example, a conductive material, such as: graphite such as natural graphite or artificial graphite; carbon black such as acetylene black, Ketjen black, channel black, furnace black, lamp black, and thermal black; conductive fibers such as carbon fibers or metal fibers; metal powder such as fluorocarbon powder, aluminum powder, and nickel powder; conductive whiskers such as zinc oxide whiskers and potassium titanate whiskers; conductive metal oxide such as titanium oxide; and polyphenylene derivatives, may be used.

The conductive agent may be included in an amount of 1 wt % to 20 wt %, preferably 1 wt % to 15 wt %, and more preferably 1 wt % to 10 wt % based on the total weight of the solid excluding the solvent in the negative electrode material mixture slurry.

The solvent may include water; or an organic solvent, such as N-methyl-2-pyrrolidone (NMP) and alcohol, and may be used in an amount such that desirable viscosity is obtained when the negative electrode active material as well as optionally the binder and the conductive agent are included. For example, the solvent may be included in an amount such that a concentration of a solid content including the negative electrode active material as well as optionally the binder and the conductive agent is in a range of 50 wt % to 95 wt %, for example, 70 wt % to 90 wt %.

In a case in which a metal itself is used as the negative electrode, the negative electrode may be prepared by a metal thin film itself or a method of physically bonding, rolling, or depositing the metal on the negative electrode collector. An electrical deposition method or chemical vapor deposition method of the metal may be used as the above deposition method.

For example, the metal thin film itself or the metal to be bonded/rolled/deposited on the negative electrode collector may include a single metal selected from the group consisting of nickel (Ni), tin (Sn), copper (Cu), and indium (In) or an alloy of two kinds of the metals thereof.

(c) Separator

The lithium secondary battery according to the present invention includes a separator between the positive electrode and the negative electrode.

The separator plays a role in blocking an internal short circuit between both electrodes and impregnating the electrolyte, wherein, after mixing a polymer resin, a filler, and a solvent to prepare a separator composition, the separator composition is directly coated on the electrode and dried to form a separator film, or, after the separator composition is cast on a support and dried, the separator may be prepared by laminating a separator film peeled from the support on the electrode.

A typically used porous polymer film, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, may be used alone or in a lamination therewith as the separator. Also, a typical porous nonwoven fabric, for example, a nonwoven fabric formed of high melting point glass fibers or polyethylene terephthalate fibers may be used, but the present invention is not limited thereto.

In this case, the porous separator may generally have a pore diameter of 0.01 μm to 50 μm and a porosity of 5% to 95%. Also, the porous separator may generally have a thickness of 5 μm to 300 μm.

The lithium secondary battery according to the present invention as described above may be suitably used in portable devices, such as mobile phones, notebook computers, and digital cameras, and electric cars such as a hybrid electric vehicle (HEV).

Thus, according to another embodiment of the present invention, a battery module including the lithium secondary battery as a unit cell and a battery pack including the battery module are provided.

The battery module or the battery pack may be used as a power source of at least one medium and large sized device of a power tool; electric cars including an electric vehicle (EV), a hybrid electric vehicle (HEV), and a plug-in hybrid electric vehicle (PHEV); or a power storage system.

A shape of the lithium secondary battery of the present invention is not particularly limited, but a cylindrical type using a can, a prismatic type, a pouch type, or a coin type may be used.

The lithium secondary battery according to the present invention may not only be used in a battery cell that is used as a power source of a small device, but may also be used as a unit cell in a medium and large sized battery module including a plurality of battery cells.

Hereinafter, the present invention will be described in detail, according to specific examples.

Mode for Carrying Out the Invention

EXAMPLES

Example 1

Preparation of Non-aqueous Electrolyte Solution

A total of 100 wt % of a non-aqueous electrolyte solution was prepared by mixing 1.2 M $LiPF_6$, 0.5 wt % of an oligomer represented by the following Formula 1A (Mw: 6,000 g/mol, m=1, n=1, x=10), 0.5 wt % of VEC (Vinyl Ethylene Carbonate), 4 wt % of PS (1,3-propane sultone), 7 wt % of FEC (Fluoroethylene Carbonate), 2 wt % of SN (succinonitrile), 3 wt % of HTCN (1,3,6-Hexanetricarbonitrile), 0.1 wt % of DCC (N,N'-Dicyclohexylcarbodiimide), 0.5 wt % of LiBOB, 0.5 wt % of LiODFB, and an organic solvent as a remainder. In this case, a mixed non-aqueous organic solvent containing ethylene carbonate (EC): propylene carbonate (PC): ethyl propionate (EP): propyl propionate (PP) in a volume ratio of 20:10:20:50 was used as the organic solvent.

[Formula 1A]

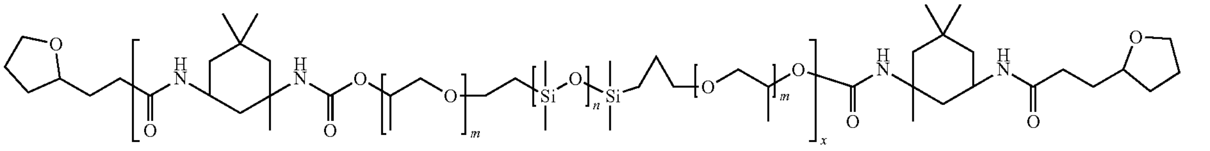

Preparation of Lithium Secondary Battery $LiCoO_2$ as a positive electrode active material, carbon black, and polyvinylidene fluoride (PVDF) were added in a weight ratio of 94:3:3 to N-methyl-2-pyrrolidone (NMP), as a solvent, to prepare a positive electrode mixture slurry. An about 20 μm thick aluminum (Al) thin film, as a positive electrode collector, was coated with the positive electrode mixture slurry, dried, and roll-pressed to prepare a positive electrode.

Graphite as a negative electrode active material, PVDF, and carbon black were added in a weight ratio of 96:3:1 to NMP, as a solvent, to prepare a negative electrode mixture slurry. A 10 μm thick copper (Cu) thin film, as a negative electrode collector, was coated with the negative electrode mixture slurry, dried, and roll-pressed to prepare a negative electrode.

An electrode assembly was prepared by sequentially stacking the positive electrode, a separator formed of three layers of polypropylene/polyethylene/polypropylene (PP/PE/PP), and the negative electrode, and 5 mL of the previously prepared non-aqueous electrolyte solution was injected into the electrode assembly to prepare a lithium secondary battery.

Example 2

A lithium secondary battery was prepared in the same manner as in Example 1 except that and amount of the oligomer represented by Formula 1A was changed to 1 wt % during the preparation of the non-aqueous electrolyte solution in Example 1.

Example 3

A lithium secondary battery was prepared in the same manner as in Example 2 except that LiBOB was not added and an amount of LiODFB was changed to 1 wt % during the preparation of the non-aqueous electrolyte solution in Example 2.

Example 4

A lithium secondary battery was prepared in the same manner as in Example 2 except that LiDFOP, instead of LiBOB, was added during the preparation of the non-aqueous electrolyte solution in Example 2.

Example 5

A lithium secondary battery was prepared in the same manner as in Example 2 except that $LiBF_4$, instead of LiBOB, was added during the preparation of the non-aqueous electrolyte solution in Example 2.

Example 6

A lithium secondary battery was prepared in the same manner as in Example 2 except that LiDFP, instead of LiBOB, was added during the preparation of the non-aqueous electrolyte solution in Example 2.

Example 7

A lithium secondary battery was prepared in the same manner as in Example 2 except that LiBOB was not added during the preparation of the non-aqueous electrolyte solution in Example 2.

Example 8

A lithium secondary battery was prepared in the same manner as in Example 7 except that DCB (dicyanobutene), instead of HTCN, was added during the preparation of the non-aqueous electrolyte solution in Example 7.

Example 9

A lithium secondary battery was prepared in the same manner as in Example 7 except that ADN (adiponitrile), instead of HTCN, was added during the preparation of the non-aqueous electrolyte solution in Example 7.

Example 10

A lithium secondary battery was prepared in the same manner as in Example 7 except that DCB (dicyanobutene), instead of SN, was added during the preparation of the non-aqueous electrolyte solution in Example 7.

Example 11

A lithium secondary battery was prepared in the same manner as in Example 10 except that an amount of DCB and an amount of HTCN were changed to 1 wt % and 1.5 wt %, respectively, during the preparation of the non-aqueous electrolyte solution in Example 10.

Comparative Example 1

A lithium secondary battery was prepared in the same manner as in Example 1 except that the oligomer represented by Formula 1A was not added and LiBOB was not added during the preparation of the non-aqueous electrolyte solution in Example 1.

Comparative Example 2

A lithium secondary battery was prepared in the same manner as in Example 2 except that an oligomer represented by the following Formula B (Mw: 6,500 g/mol, m=1, n=1, x=10), instead of the oligomer represented by Formula 1A, was used and LiBOB was not added during the preparation of the non-aqueous electrolyte solution in Example 2.

[Formula B]

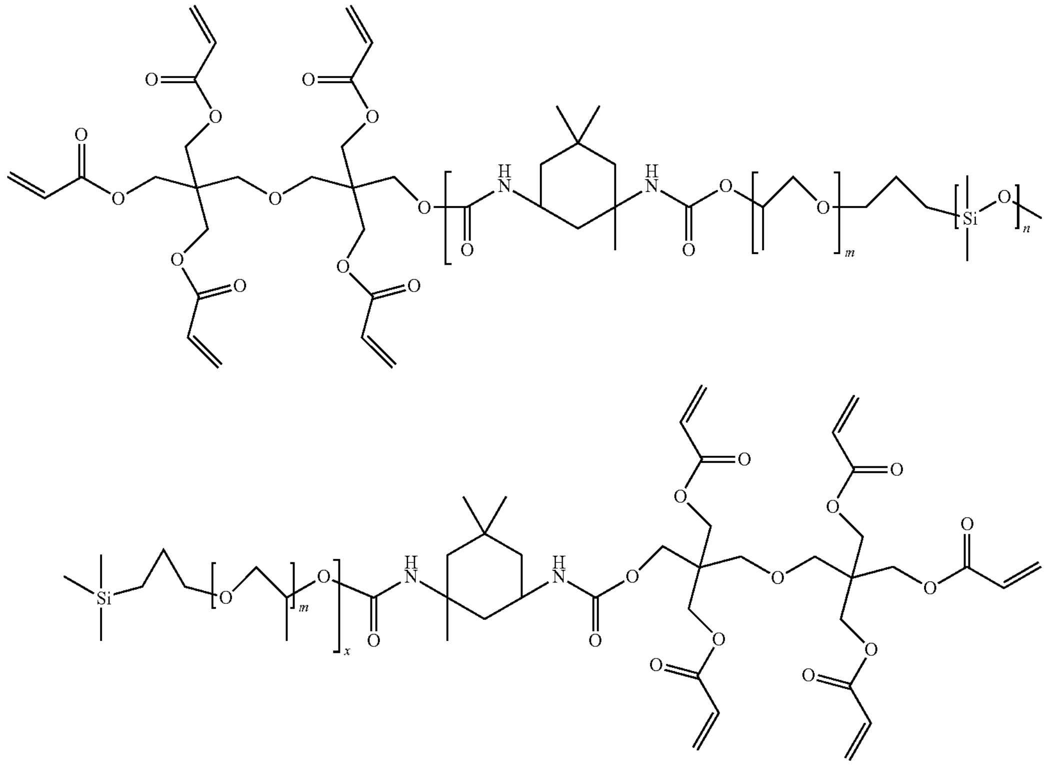

Comparative Example 3

A lithium secondary battery was prepared in the same manner as in Example 7 except that the oligomer represented by Formula 1A was not added and SN and HTCN were not added during the preparation of the non-aqueous electrolyte solution in Example 7.

Comparative Example 4

A lithium secondary battery was prepared in the same manner as in Example 7 except that the oligomer represented by Formula 1A was not added during the preparation of the non-aqueous electrolyte solution in Example 7.

Comparative Example 5

A lithium secondary battery was prepared in the same manner as in Example 7 except that the oligomer represented by Formula B (Mw: 6,500 g/mol, m=1, n=1, x=10), instead of the oligomer represented by Formula 1A, was used during the preparation of the non-aqueous electrolyte solution in Example 7.

Experimental Examples

Experimental Example 1: Initial Capacity Measurement and Life Characteristics Evaluation (High Temperature)

After an activation (formation) process was performed at 0.2 C rate and 25° C. on each of the lithium secondary batteries of the examples and the comparative examples, gas in each battery was removed through a degassing process, each lithium secondary battery having gas removed therefrom was charged at 0.7 C rate to 4.45 V under a constant current/constant voltage (CC/CV) condition at a temperature of 45° C., cut-off charged at 0.05 C, and discharged at a constant current of 0.5 C rate to 3.0 V.

Performance of the charging/discharging once was set as one cycle, and discharge capacity in an initial state (1 cycle) was measured and listed as initial capacity in Table 1 below. Also, after 300 cycles, capacity retention relative to the initial discharge capacity was measured and listed in Table 1 below. The charging/discharging process was performed using PNE-0506 charge/discharge equipment (manufacturer: PNE solution).

Experimental Example 2: Thermal Safety Evaluation

A hot box evaluation test was conducted in which each of the lithium secondary batteries prepared in the examples and the comparative examples in a fully charged state at a state of charge (SOC) of 100% was heated to 140° C. at a heating rate of 5° C./min and was then left standing for one hour to confirm whether or not the battery was ignited.

The results thereof are listed in Table 1 below, a case, in which the battery was ignited, was indicated as "FAIL", and a case, in which the battery was not ignited, was indicated as "PASS".

TABLE 1

| | Oligomer | | Additive | | Experimental Example 1 | | Experimental Example 2 |
|---|---|---|---|---|---|---|---|
| | Structure | Amount in electrolyte solution (wt %) | Lithium salt-based (amount) | Nitrile-based (amount) | Initial discharge capacity (mAh) | High-temperature capacity retention (%) | Thermal safety evaluation |
| Example 1 | Formula 1A | 0.5 | LiODFB(0.5)/ LiBOB(0.5) | SN(2)/ HTCN(3) | 4,440 | 93 | PASS |
| Example 2 | Formula 1A | 1 | LiODFB(0.5)/ LiBOB(0.5) | SN(2)/ HTCN(3) | 4,434 | 93 | PASS |
| Example 3 | Formula 1A | 1 | LiODFB(1) | SN(2)/ HTCN(3) | 4,427 | 89 | PASS |
| Example 4 | Formula 1A | 1 | LiODFB(0.5)/ LiDFOP(0.5) | SN(2)/ HTCN(3) | 4,430 | 91 | PASS |
| Example 5 | Formula 1A | 1 | LiODFB(0.5)/ $LiBF_4$(0.5) | SN(2)/ HTCN(3) | 4,431 | 90 | PASS |
| Example 6 | Formula 1A | 1 | LiODFB(0.5)/ LiDFP(0.5) | SN(2)/ HTCN(3) | 4,430 | 90 | PASS |
| Example 7 | Formula 1A | 1 | LiODFB(0.5) | SN(2)/ HTCN(3) | 4,379 | 83 | PASS |
| Example 8 | Formula 1A | 1 | LiODFB(0.5) | SN(2)/ DCB(3) | 4,381 | 86 | PASS |
| Example 9 | Formula 1A | 1 | LiODFB(0.5) | SN(2)/ AND(3) | 4,377 | 84 | PASS |
| Example 10 | Formula 1A | 1 | LiODFB(0.5) | DCB(2)/ HTCN(3) | 4,396 | 90 | PASS |
| Example 11 | Formula 1A | 1 | LiODFB(0.5) | DCB(1)/ HTCN(1.5) | 4,401 | 89 | PASS |
| Comparative Example 1 | — | — | LiODFB(0.5) | SN(2)/ HTCN(3) | 4,421 | 78 | FAIL |
| Comparative Example 2 | Formula B | 1 | LiODFB(0.5) | SN(2)/ HTCN(3) | 4,298 | 81 | PASS |
| Comparative Example 3 | — | — | LiODFB(0.5) | — | 4,376 | 61 | FAIL |
| Comparative Example 4 | — | — | LiODFB(0.5) | SN(2)/ HTCN(3) | 4,421 | 78 | FAIL |

TABLE 1-continued

| | Oligomer | | Additive | | Experimental Example 1 | | Experimental Example 2 |
|---|---|---|---|---|---|---|---|
| | Structure | Amount in electrolyte solution (wt %) | Lithium salt-based (amount) | Nitrile-based (amount) | Initial discharge capacity (mAh) | High-temperature capacity retention (%) | Thermal safety evaluation |
| Comparative Example 5 | Formula B | 1 | LiODFB(0.5) | SN(2)/ HTCN(3) | 4,298 | 81 | PASS |

According to the results of Table 1, it may be confirmed that the batteries of Examples 1 to 11 including the oligomer represented by Formula 1 of the present invention in the electrolyte solution were better in terms of initial capacity, lifetime, and thermal safety than the batteries of Comparative Examples 1 to 5 which did not include the oligomer represented by Formula 1 of the present invention.

Specifically, it was found that Comparative Examples 1, 3, and 4 without using the oligomer and Comparative Examples 2 and 5 using the oligomer with a modified terminal group in Formula 1 of the present invention all had poorer initial capacity and capacity retention than Examples 1 to 11. Particularly, with respect to Comparative Examples 1, 3, and 4 in which the oligomer was not used at all, it may be confirmed that capacity retentions were not only less than 80%, but they were also vulnerable to heat so as not to pass thermal stability evaluation.

Also, with respect to Comparative Examples 2 and 5 using the oligomer of Formula B, it may be confirmed that the initial capacities were reduced in comparison to that of Comparative Example 1 in which the oligomer was not added at all. That is, it may be understood that the initial capacities may be reduced when a terminal group structure of Formula 1 of the present invention was not followed.

Furthermore, when comparing Example 2 and Example 3 which were performed under the same conditions except for the lithium salt-based additive, it may be understood that Example 2, in which two kinds of the lithium salt-based additives were mixed even if a total amount of the lithium salt-based additives was the same, had better initial capacity and life characteristics than Example 3.

Also, it may be confirmed that Example 2 using a combination of LiODFB and LiBOB exhibited the best life characteristics among Examples 2 and 4 to 6 in which the two kinds of the lithium salt-based additives were mixed.

According to the fact that initial capacities and capacity retentions of Examples 10 and 11 were the best among Examples 7 to 11 in which conditions of the oligomer and lithium salt-based additive were the same, it may be understood that a combination of DCB and HTCN among the nitrile-based additives was the most effective in improving battery capacity and lifetime.

The invention claimed is:

1. A non-aqueous electrolyte solution for a lithium secondary battery, comprising:

an oligomer represented by Formula 1;
a lithium salt; and
an organic solvent:

Formula 1

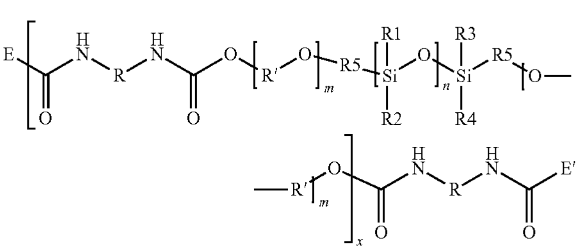

wherein, in Formula 1,

R is an aliphatic hydrocarbon group or an aromatic hydrocarbon group,

R' is an unsubstituted or substituted alkylene group having 1 to 5 carbon atoms, R1 to R4 are same or different from each other and are each independently an unsubstituted or substituted alkyl group having 1 to 3 carbon atoms, R5 is an unsubstituted or substituted alkylene group having 1 to 5 carbon atoms, n is an integer of 1 to 10, m is an integer of 1 to 5, x is an integer of 1 to 200, and E and E' are same or different from each other and are each independently represented by Formula 2, Formula 2

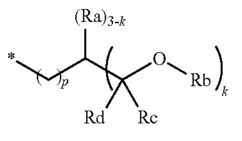

wherein, in Formula 2,

Ra and Rb are same or different from each other and are each independently hydrogen; an alkyl group having 1 to 6 carbon atoms which is unsubstituted or substituted with a halogen group; or an alkenyl group having 1 to 6 carbon atoms which is unsubstituted or substituted with a halogen group, Rc and Rd are same or different from each other and are each independently hydrogen or an alkyl group having 1 to 5 carbon atoms, Rb and Rc may be bonded to each other to form a cycloalkyl group including O, and p is an integer of 0 to 4, and k is an integer of 1 to 3.

2. The non-aqueous electrolyte solution for a lithium secondary battery of claim 1, wherein Formula 2 is represented by Formula 2-1 or Formula 2-2:

Formula 2-1

$$*-(CH_2)_{p'}(CH_2)_2-OH$$

wherein, in Formula 2-1, p' is an integer of 0 to 4,

Formula 2-2

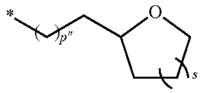

wherein, in Formula 2-2, p" is an integer of 0 to 4, and s is 1 or 2.

3. The non-aqueous electrolyte solution for a lithium secondary battery of claim 1, wherein, in Formula 1, the aliphatic hydrocarbon group of R is selected from the group consisting of an unsubstituted or substituted alkylene group having 1 to 20 carbon atoms; an unsubstituted or substituted cycloalkylene group having 4 to 20 carbon atoms; an unsubstituted or substituted heterocycloalkylene group having 2 to 20 carbon atoms; an unsubstituted or substituted alkenylene group having 2 to 20 carbon atoms; and an unsubstituted or substituted alkynylene group having 2 to 20 carbon atoms, and the aromatic hydrocarbon group of R is selected from the group consisting of an unsubstituted or substituted arylene group having 6 to 20 carbon atoms; and an unsubstituted or substituted heteroarylene group having 2 to 20 carbon atoms.

4. The non-aqueous electrolyte solution for a lithium secondary battery of claim 1, wherein Formula 1 is represented by Formula 1-1:

Formula 1-1

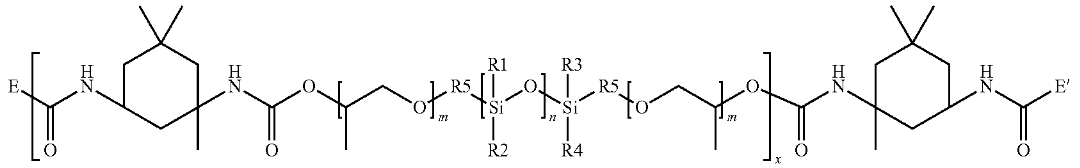

wherein, in Formula 1-1,

R, R1 to R5, E, E', n, m, and x are same as defined in Formula 1.

5. The non-aqueous electrolyte solution for a lithium secondary battery of claim 1, wherein an amount of the oligomer is in a range of 0.1 wt % to 5 wt % based on a total weight of the non-aqueous electrolyte solution.

6. The non-aqueous electrolyte solution for a lithium secondary battery of claim 1, further comprising at least one additive selected from the group consisting of a lithium salt-based additive and a nitrile-based additive.

7. The non-aqueous electrolyte solution for a lithium secondary battery of claim 6, wherein the lithium salt-based additive comprises at least one selected from the group consisting of lithium tetrafluoroborate, lithium bis(oxalato) borate, lithium difluoro (oxalato) borate, lithium difluorophosphate, and lithium difluoro bis(oxalato)phosphate, and the lithium salt is different from the lithium salt-based additive.

8. The non-aqueous electrolyte solution for a lithium secondary battery of claim 6, wherein an amount of the lithium salt-based additive is in a range of 0.05 wt % to 5 wt % based on a total weight of the non-aqueous electrolyte solution.

9. The non-aqueous electrolyte solution for a lithium secondary battery of claim 6, wherein the nitrile-based additive comprises at least one selected from the group consisting of succinonitrile, adiponitrile, sebaconitrile, dicyanobutene, hexanetricarbonitrile, 1,2,3-tris(2-cyanoethoxy) propane, and ethylene glycol bis(propionitrile) ether.

10. The non-aqueous electrolyte solution for a lithium secondary battery of claim 6, wherein an amount of the nitrile-based additive is in a range of 0.05 wt % to 10 wt % based on a total weight of the non-aqueous electrolyte solution.

11. The non-aqueous electrolyte solution for a lithium secondary battery of claim 1, further comprising lithium difluoro (oxalato) borate and lithium bis(oxalato) borate.

12. The non-aqueous electrolyte solution for a lithium secondary battery of claim 11, wherein a weight ratio of the lithium difluoro (oxalato) borate to the lithium bis(oxalato) borate is in a range of 10:90 to 90:10.

13. The non-aqueous electrolyte solution for a lithium secondary battery of claim 1, further comprising dicyanobutene and hexanetricarbonitrile.

14. The non-aqueous electrolyte solution for a lithium secondary battery of claim 13, wherein a weight ratio of the dicyanobutene to the hexanetricarbonitrile is in a range of 10:90 to 90:10.

15. A lithium secondary battery comprising:

a positive electrode including a positive electrode active material;

a negative electrode including a negative electrode active material;

a separator disposed between the positive electrode and the negative electrode; and the non-aqueous electrolyte solution according to claim 1.

* * * * *